(12) United States Patent
Thubert et al.

(10) Patent No.: US 8,363,662 B2
(45) Date of Patent: Jan. 29, 2013

(54) ALTERNATE DOWN PATHS FOR DIRECTED ACYCLIC GRAPH (DAG) ROUTING

(75) Inventors: Pascal Thubert, La Colle sur Loup (FR); Patrick Wetterwald, Mouans Sartoux (FR); Jean-Philippe Vasseur, Saint Martin dUriage (FR)

(73) Assignee: Cisco Technology, Inc., San Jose, CA (US)

( * ) Notice: Subject to any disclaimer, the term of this patent is extended or adjusted under 35 U.S.C. 154(b) by 348 days.

(21) Appl. No.: 12/727,893

(22) Filed: Mar. 19, 2010

(65) Prior Publication Data

US 2011/0228788 A1 Sep. 22, 2011

(51) Int. Cl.
H04L 12/28 (2006.01)

(52) U.S. Cl. ........ 370/400; 370/401; 370/402; 370/406; 370/410

(58) Field of Classification Search ........... 370/400–410
See application file for complete search history.

(56) References Cited

U.S. PATENT DOCUMENTS

| | | | |
|---|---|---|---|
| 6,105,018 A * | 8/2000 | Demers et al. ........................ 1/1 |
| 6,212,666 B1 * | 4/2001 | Gohl et al. ..................... 716/108 |
| 6,385,649 B1 * | 5/2002 | Draves et al. ................. 709/224 |
| 6,633,544 B1 * | 10/2003 | Rexford et al. .............. 370/238 |
| 6,717,950 B2 * | 4/2004 | Lui et al. ........................ 370/408 |
| 7,423,981 B2 * | 9/2008 | Brown ........................... 370/256 |
| 7,496,078 B2 | 2/2009 | Rahman |
| 7,593,377 B2 | 9/2009 | Thubert et al. |
| 7,656,857 B2 | 2/2010 | Thubert et al. |
| 7,668,119 B2 | 2/2010 | Thubert et al. |
| 2006/0133328 A1 * | 6/2006 | Levendel et al. .............. 370/338 |
| 2006/0227724 A1 * | 10/2006 | Thubert et al. ................ 370/254 |
| 2006/0291404 A1 | 12/2006 | Thubert et al. |
| 2007/0104120 A1 * | 5/2007 | Shah-Heydari ............... 370/256 |
| 2008/0025270 A1 * | 1/2008 | Moon ............................ 370/338 |
| 2008/0052692 A1 | 2/2008 | Chockler et al. |
| 2009/0289661 A1 * | 11/2009 | Lee et al. ......................... 326/41 |
| 2011/0026437 A1 * | 2/2011 | Roja-Cessa et al. .......... 370/256 |
| 2011/0116389 A1 * | 5/2011 | Tao et al. ....................... 370/252 |

OTHER PUBLICATIONS

Thubert, P., "RPL, Objective Function 0", draft-ietf-roll-of0-01, Network Working Group, Internet Draft, IETF, Feb. 18, 2010, 9 pages.
Vasseur, JP., et al., "Routing Metrics Used for Path Calculation in Low Power and Lossy Networks", draft-ietf-roll-routing-metrics-04, Network Working Group, Internet Draft, IETF, Dec. 3, 2009, 30 pages.

(Continued)

Primary Examiner — Ayaz Sheikh
Assistant Examiner — Andrew C Lee
(74) Attorney, Agent, or Firm — Cesari and McKenna, LLP

(57) ABSTRACT

In one embodiment, a node "N" within a computer network utilizing directed acyclic graph (DAG) routing selects a parent node "P" within the DAG, and, where P is not a DAG root, may determine a grandparent node "GP" as a parent node to the parent node P. The node N may then also select an alternate parent node "P'" that has connectivity to GP and N. N may then inform P and P' about prefixes reachable via N, and also about P' as an alternate parent node to P to reach the prefixes reachable via N. Also, in one embodiment, P may be configured to inform GP about the prefixes reachable via N and also about P' as an alternate parent node to P to reach the prefixes reachable via N, and P' may be configured to store the prefixes reachable via N without informing other nodes about those prefixes.

23 Claims, 18 Drawing Sheets

OTHER PUBLICATIONS

Winter, T., et al., "RPL: IPv6 Routing Protocol for Low Power and Lossy Networks", draft-ieft-roll-rpl-07, Network Working Group, Internet Draft, IETF, Mar. 8, 2010, 83 pages.

Nuvolone "Stability Analysis of the Delays of the Routing Protocol over Low Power and Lossy Networks," KTH Electrical Engineering Masters Degree Project, Apr. 10, 2010. 76 pages, Stockholm, Sweden.

PCT Notification of Transmittal of the International Search Report and the Written Opinion of the International Searching Authority, or the Declaration, International Searching Authority, International Application No. PCT/US2011/00470, mailed May 16, 2011, 11 pages.

* cited by examiner

ALTERNATE DOWN PATHS FOR DIRECTED ACYCLIC GRAPH (DAG) ROUTING

TECHNICAL FIELD

The present disclosure relates generally to computer networks, and, more particularly, to directed acyclic graph (DAG) routing, e.g., for Low power and Lossy Networks (LLNs).

BACKGROUND

Various mesh protocols may be used in computer networks in order to form directed acyclic graphs (DAGs) and trees to allow devices within the DAG to reach a root device or "clusterhead" (e.g., a "sink"). Often, that root device may interconnect the devices of the DAG with a larger infrastructure, such as the Internet, a wide area network, or other domain.

In certain applications, such as wireless device implementations (e.g., sensor networks), DAGs are formed that provide an alternate next-hop towards the root device for most of the devices in the network due to the lossy nature of the network. Unfortunately, an arbitrary DAG toward the root may not result in the same desired redundancy properties in a reverse direction. In other words, even if the DAG approaches the goal of alternate next-hops for as many devices as possible toward the root (an "up" direction), reversing the same DAG, a typical technique to create routes from the root to arbitrary destinations (a "down" direction), does not necessarily provide alternate next-hops towards the destinations.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
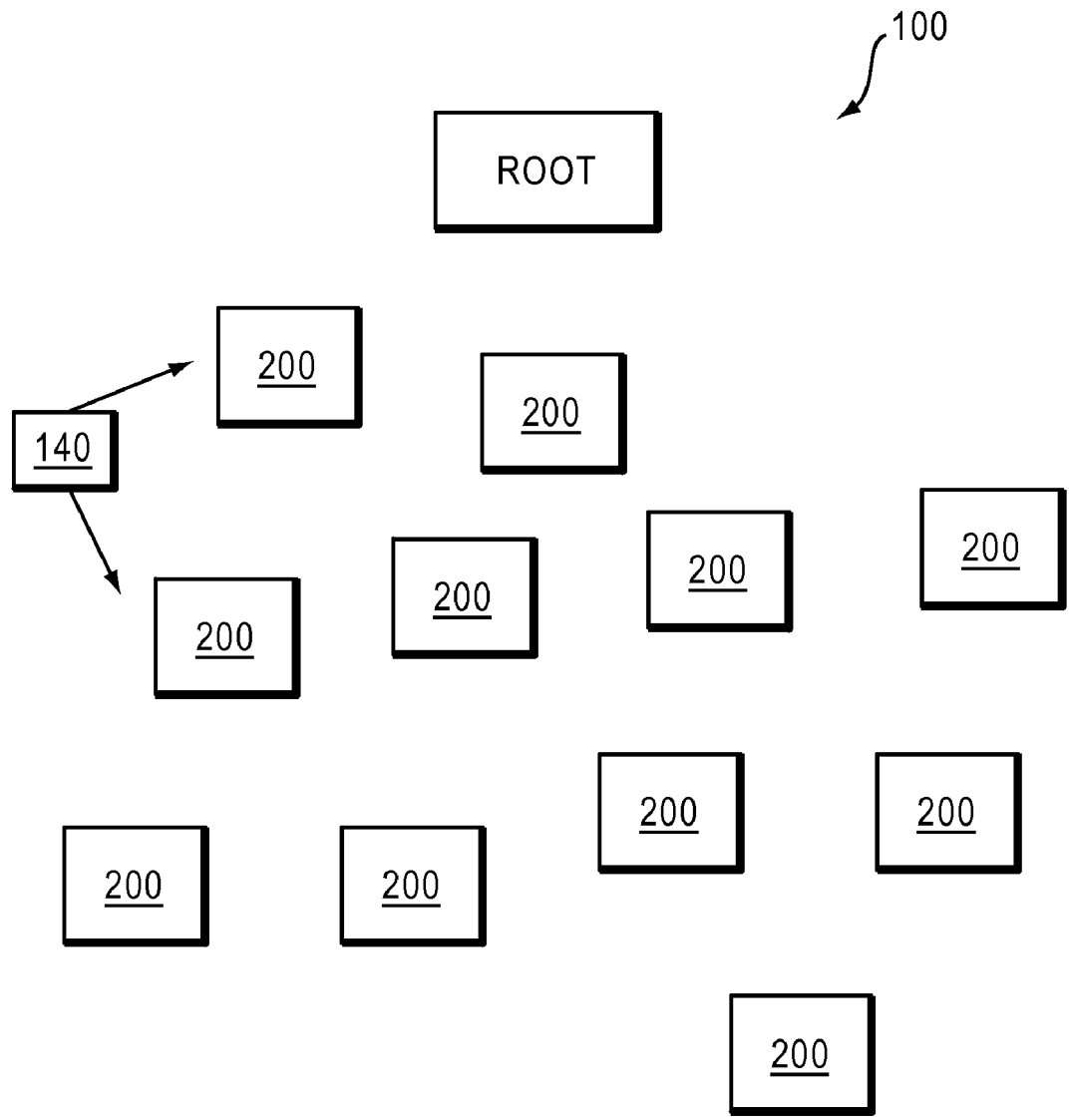
FIG. 1 illustrates an example computer network.

According to one or more embodiments of the disclosure, a node "N" within a computer network utilizing directed acyclic graph (DAG) routing selects a parent node "P" within the DAG, and, where P is not a root of the DAG, may determine a grandparent node "GP" as a parent node to the parent node P. The node N may then also select an alternate parent node "P'" that has connectivity to GP and N, if available. As such, N may then inform P and P' about prefixes reachable via N, and also about P' as an alternate parent node to P to reach the prefixes reachable via N in the event P is unreachable. Also, according to one or more embodiments of the disclosure, P may be configured to inform GP about the prefixes reachable via N (a child of P) and also about P' as an alternate parent node to P to reach the prefixes reachable via N in the event P is unreachable, and P' may be configured to store the prefixes reachable via N without informing other nodes about those prefixes, e.g., to prevent fan-out.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC). In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network consisting of spatially distributed autonomous devices such as sensors that cooperatively monitor physical or environmental conditions at different locations, such as, e.g., temperature, pressure, vibration, sound, radiation, motion, pollutants, etc. Other types of smart object in LLNs are actuators, e.g., responsible for turning on/off an engine or perform any other actions. Sensor networks are typically wireless networks, though wired connections are also available. That is, in addition to one or more sensors, each sensor device (node) in a sensor network may generally be equipped with a radio transceiver or other communication port, a microcontroller, and an energy source, such as a battery. Generally, size and cost constraints on sensor nodes result in corresponding constraints on resources such as energy, memory, computational speed and bandwidth. Correspondingly, a reactive routing protocol may, though need not, be used in place of a proactive routing protocol for sensor networks.

In certain configurations, the sensors in a sensor network transmit their data to one or more centralized or distributed database management nodes that obtain the data for use with one or more associated applications. Alternatively (or in addition), certain sensor networks provide for mechanisms by which an interested subscriber (e.g., "sink") may specifically request data from devices in the network. In a "push mode," the sensors transmit their data to the sensor sink/subscriber without prompting, e.g., at a regular interval/frequency or in response to external triggers. Conversely, in a "pull mode," the sensor sink may specifically request that the sensors (e.g., specific sensors or all sensors) transmit their current data (or take a measurement, and transmit that result) to the sensor sink. (Those skilled in the art will appreciate the benefits and shortcomings of each mode, and both apply to the techniques described herein.)

FIG. 1 is a schematic block diagram of an example computer network 100 illustratively comprising nodes/devices 200, such as, e.g., routers, sensors, computers, etc., interconnected by various methods of communication. For instance, the links may be wired links or may comprise a wireless communication medium, where certain nodes 200 may be in communication with other nodes 200, e.g., based on distance, signal strength, current operational status, location, etc. Those skilled in the art will understand that any number of nodes, devices, links, etc. may be used in the computer network, and that the view shown herein is for simplicity. Illustratively, certain devices in the network may be more capable than others, such as those devices having larger memories, sustainable non-battery power supplies, etc., versus those devices having minimal memory, battery power, etc. As described further herein, one or more of the devices 200 may be considered "root nodes/devices," while one or more of the devices may also be considered "destination nodes/devices."

Data packets 140 (e.g., traffic and/or messages sent between the devices/nodes) may be exchanged among the nodes/devices of the computer network 100 using predefined network communication protocols such as the Transmission Control Protocol/Internet Protocol (TCP/IP), User Datagram Protocol (UDP), Multi-Protocol Label Switching (MPLS), various proprietary protocols, etc. In this context, a protocol consists of a set of rules defining how the nodes interact with each other.

Figure 2:
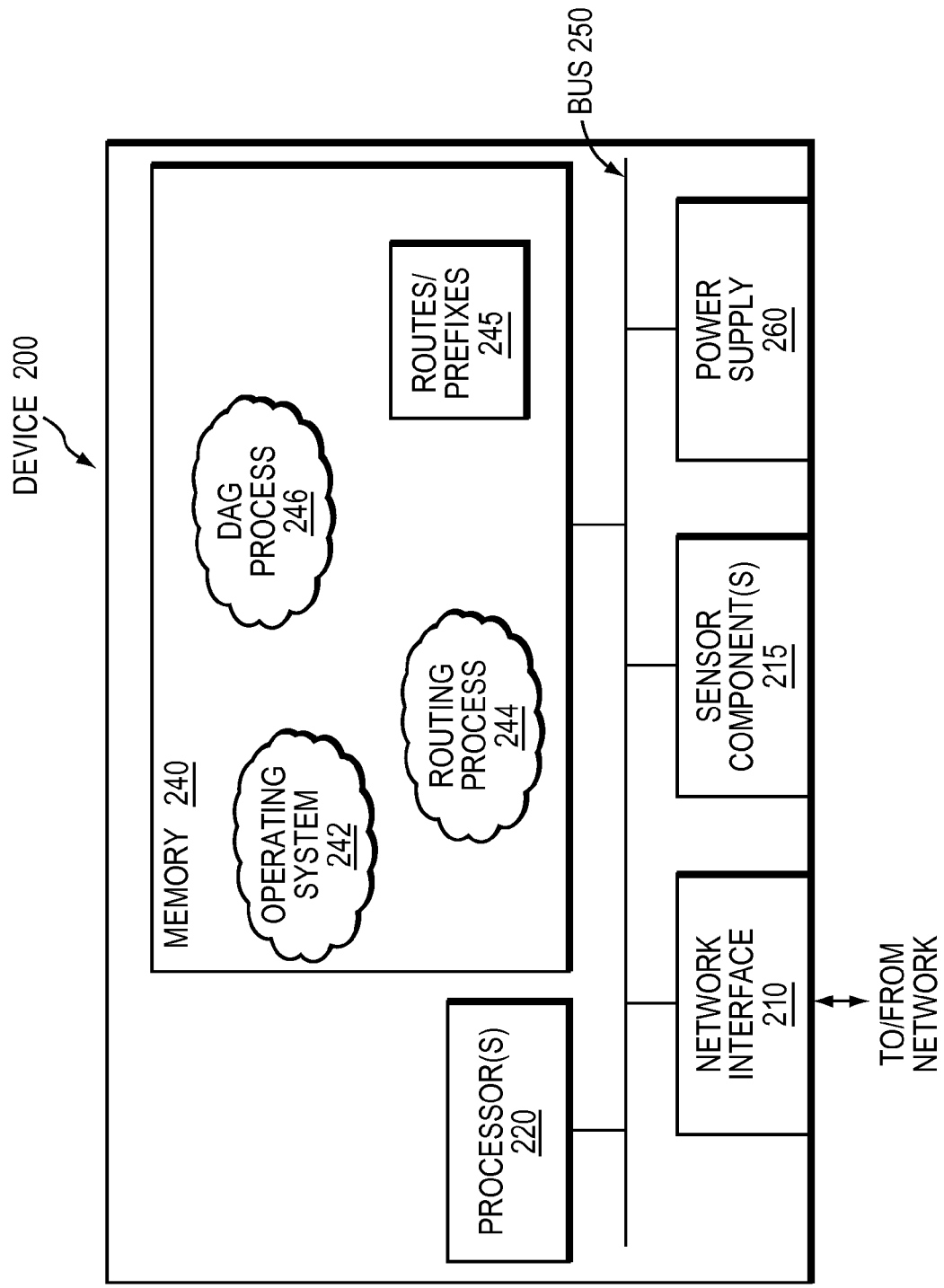
FIG. 2 illustrates an example network device/node.

FIG. 2 is a schematic block diagram of an example node/device 200 that may be used with one or more embodiments described herein, e.g., as a device or sensor. The device may comprise one or more network interfaces 210, one or more sensor components 215, a processor 220 (e.g., an 8-64 bit microcontroller), and a memory 240 interconnected by a system bus 250, as well as a power supply 260 (e.g., battery, plug-in, etc.). The network interface(s) 210 contain the mechanical, electrical, and signaling circuitry for communicating data over physical and/or wireless links coupled to the network 100. The network interfaces may be configured to transmit and/or receive data using a variety of different communication protocols, including, inter alia, TCP/IP, UDP, wireless protocols (e.g., IEEE Std. 802.15.4, WiFi, Bluetooth®), Ethernet, powerline communication (PLC) protocols, etc.

The memory 240 comprises a plurality of storage locations that are addressable by the processor(s) 220 and the network interfaces 210 for storing software programs and data structures associated with the embodiments described herein. The processors 220 may comprise necessary elements or logic adapted to execute the software programs and manipulate the data structures, such as routes or prefixes 245. An operating system 242, portions of which are typically resident in memory 240 and executed by the processor(s), functionally organizes the device by, inter alia, invoking operations in support of software processes and/or services executing on the device. These software processes and/or services may comprise routing process/services 244, which may include an illustrative directed acyclic graph (DAG) process 246. It will be apparent to those skilled in the art that other processor and memory types, including various computer-readable media, may be used to store and execute program instructions pertaining to the techniques described herein.

Routing process (services) 244 contains computer executable instructions executed by the processor 220 to perform functions provided by one or more routing protocols, such as proactive or reactive routing protocols as will be understood by those skilled in the art. These functions may be configured to manage a routing/forwarding table 245 containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks"<draft-ietf-roll-rpl-07> by Winter, et al. (Mar. 8, 2010 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc.

A DAG is a directed graph having the property that all edges are oriented in such a way that no cycles (loops) exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, a sibling of a node within a DAG is defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG has one parent or, as used herein, one preferred parent.

DAGs may generally be built based on an Objective Function (OF), which defines a set of routing metrics, optimization objectives, constraints, and related functions are in use in a DAG. That is, role of the Objective Function is to specify one or more metrics to optimize the DAG against, as well as how these are used to compute a best (e.g., shortest) path. Also, the OF may include an optional set of constraints to compute a constrained path, such as where if a link or a node does not satisfy a required constraint, it is "pruned" from the candidate list when computing the best path. Additionally, OFs may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function, it may be configured to join a DAG as a leaf node.

Illustratively, example metrics used to select paths (e.g., preferred parents) based on an OF may comprise cost, delay, latency, bandwidth, estimated transmission count (ETX), etc., while example constraints that may be placed on the route selection may comprise various reliability thresholds, restrictions on battery operation, multipath diversity, load balancing requirements, bandwidth requirements, transmission types (e.g., wired, wireless, etc.), and also a number of selected parents (e.g., single parent trees or multi-parent DAGs). Notably, an example for how routing metrics may be obtained may be found in an IETF Internet Draft, entitled "Routing Metrics used for Path Calculation in Low Power and Lossy Networks"<draft-ietf-roll-routing-metrics-04> by Vasseur, et al. (Dec. 3, 2009 version). Further, an example OF (e.g., a default OF) may be found in an IETF Internet Draft, entitled "RPL Objective Function 0"<draft-ietf-roll-of 0-01> by Thubert (Feb. 18, 2010 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is only connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery request message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going against the orientation of the edges within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s), informing each successive receiving device is in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop address to a reverse route record stack (e.g., a "Reverse Route Stack" contained within a RPL DAO message). The reverse route record stack may then be subsequently used to generate piecewise source routes over regions of the DAG that are incapable of storing downward routing state.

Figure 3:
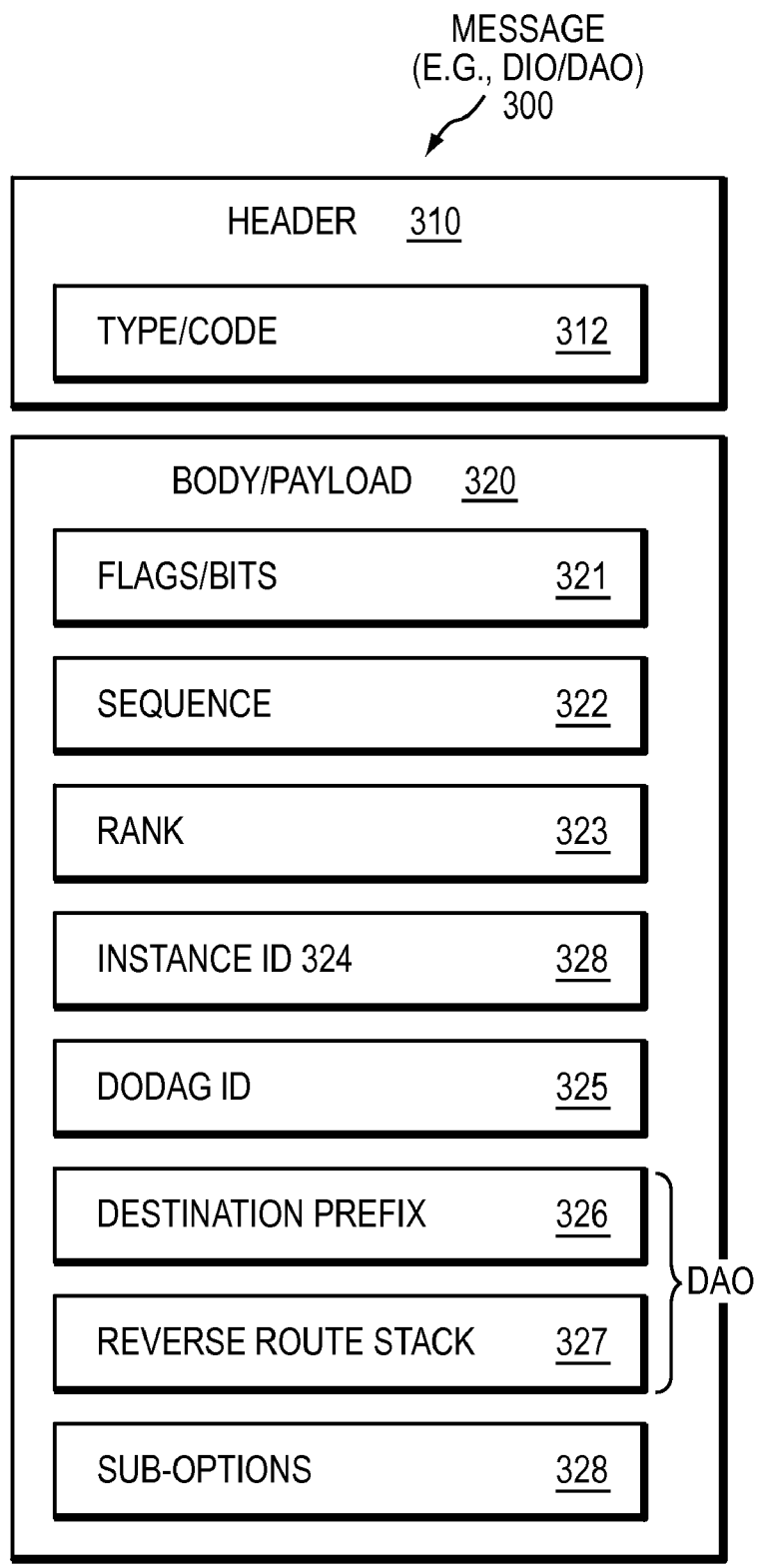
FIG. 3 illustrates an example message.

FIG. 3 illustrates an example simplified control message format 300 that may be used for discovery and route dissemination when building a DAG, e.g., as a DIO or DAO. Message 300 illustrative comprises a header 310 within one or more fields 312 that identify the type of message (e.g., a RPL control message), and a specific code indicating the specific type of message, e.g., a DIO or a DAO (or a DAG Information Solicitation). Within the body/payload 320 of the message may be a plurality of fields used to relay the pertinent information. In particular, the fields may comprise various flags/bits 321, a sequence number 322, a rank value 323, an instance ID 324, and a DAG ID 325, and other fields, each as may be appreciated in more detail by those skilled in the art. Further, for DAO messages, additional fields for destination prefixes 326 and a reverse route stack 327 may also be included. For either DIOs or DAOs, one or more additional sub-option fields 328 may be used to supply additional or custom information within the message 300. For instance, an objective code point (OCP) sub-option field may be used within a DIO to carry codes specifying a particular objective function (OF) to be used for building the associated DAG.

Figure 4A:
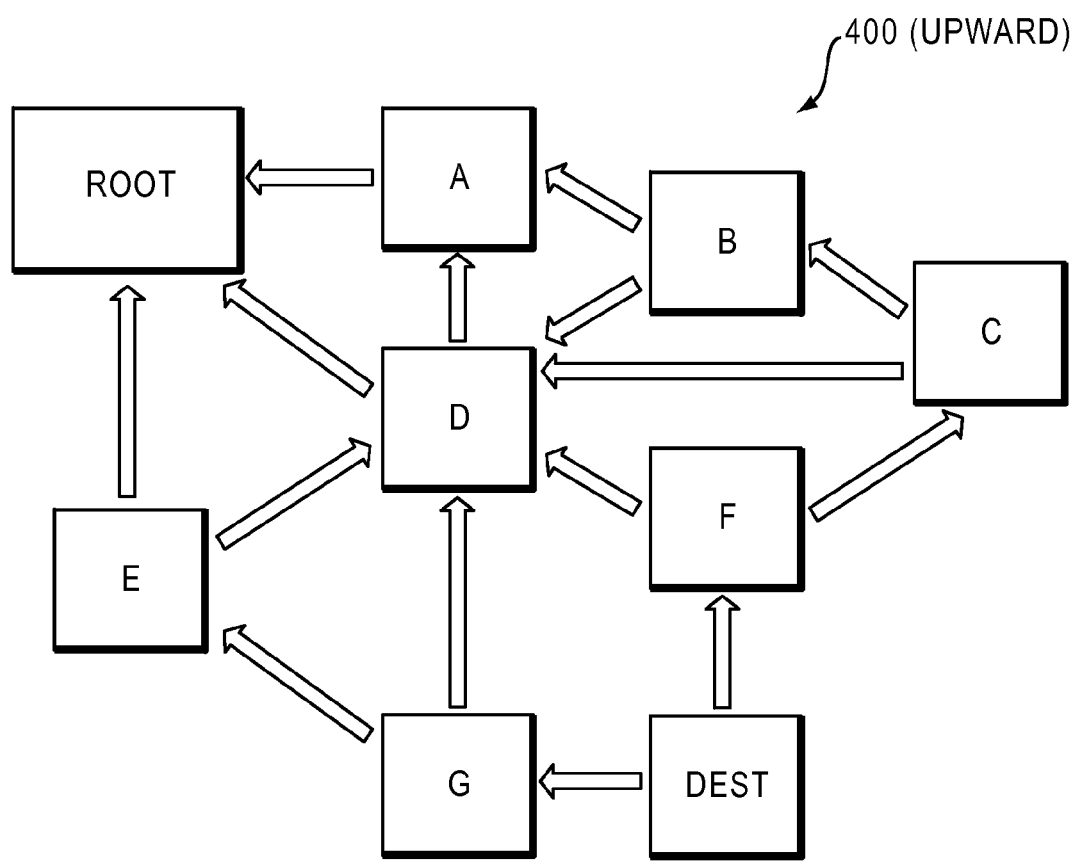
FIGS. 4A-B illustrate example asymmetrical directed acyclic graphs (DAGs)
Figure 4B:
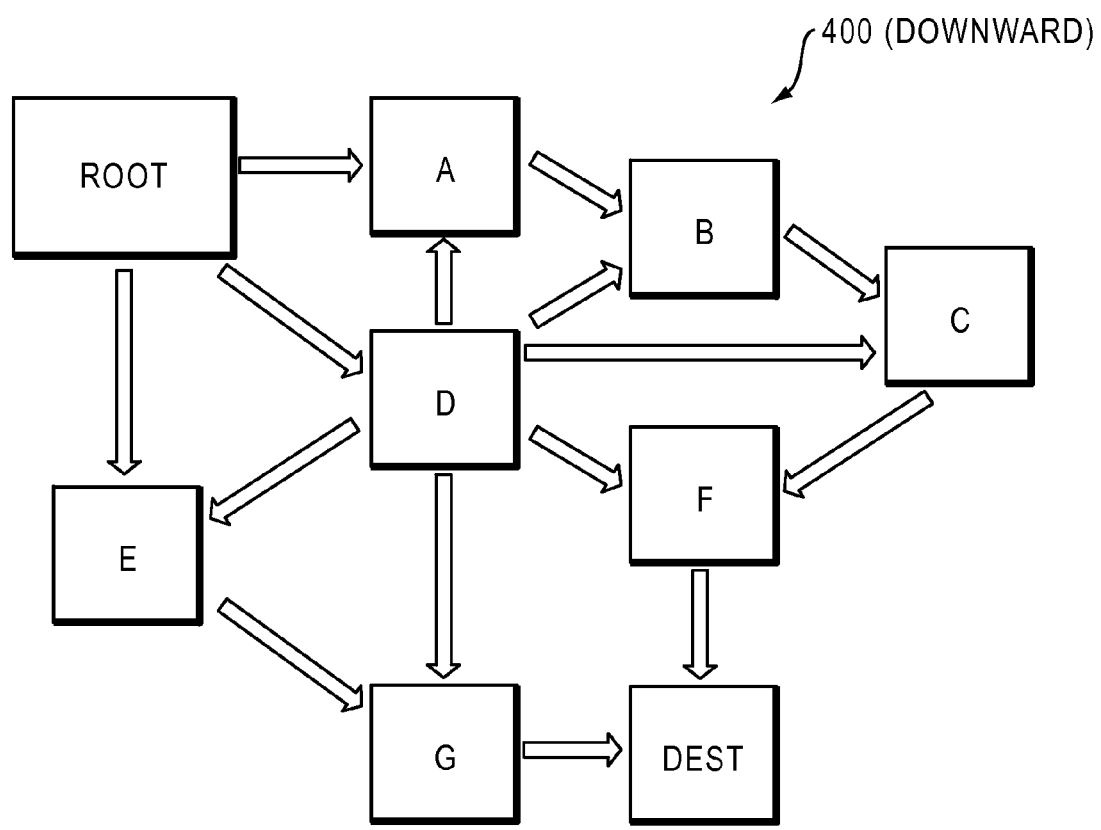

As noted above, certain applications, such as wireless device implementations (e.g., sensor networks), form DAGs that provide an alternate next-hop towards the root device for most of the devices in the network due to the lossy nature of the network. Unfortunately, an arbitrary DAG toward the root may not result in the same desired redundancy properties in a reverse direction. For instance, as described above, a DAO message may be used to establish routes along a reverse DAG in a downward direction, but in this manner there is no guarantee that redundancy in the upward direction will result in the same redundancy downward. Rather, as a result of DAG asymmetry, certain nodes may end up with a single next-hop, while other nodes may end up with many next-hops, which is a waste of valuable resources. FIG. 4A illustrates an example DAG 400 in the upward direction from a destination to a root that was created to provide redundant upward paths. As can be seen, all nodes except node "A" have two successors toward the root. Alternatively, FIG. 4B illustrates the same example DAG 400 in reverse (the downward direction). As can be further seen, nodes B, C, E, F, and G have only one successor towards the particular destination node.

Alternate Down Paths for DAGs

According to one or more embodiments of the disclosure, a node within a DAG may select a parent node, and based on the corresponding grandparent (the parent's parent), may also select an alternate parent node that has connectivity to the grandparent and the node itself. The node may then inform its parent and alternate parent about the prefixes that can be reached via the node in the downward direction, such that the parent continues to forward that information to the grandparent, along with the indication to use the alternate parent in the event the parent becomes unreachable. To prevent fan-out of this information, the alternate parent may simply store the reachability information for use when the node's grandparent forwards traffic on the established alternate down path. Illustratively, the techniques described in more detail herein may be performed by hardware, software, and/or firmware, such as in accordance with a DAG process 246, which may contain computer executable instructions executed by the processor 220 to perform functions relating to the novel techniques described herein, e.g., in conjunction with routing process 244.

Figure 5:
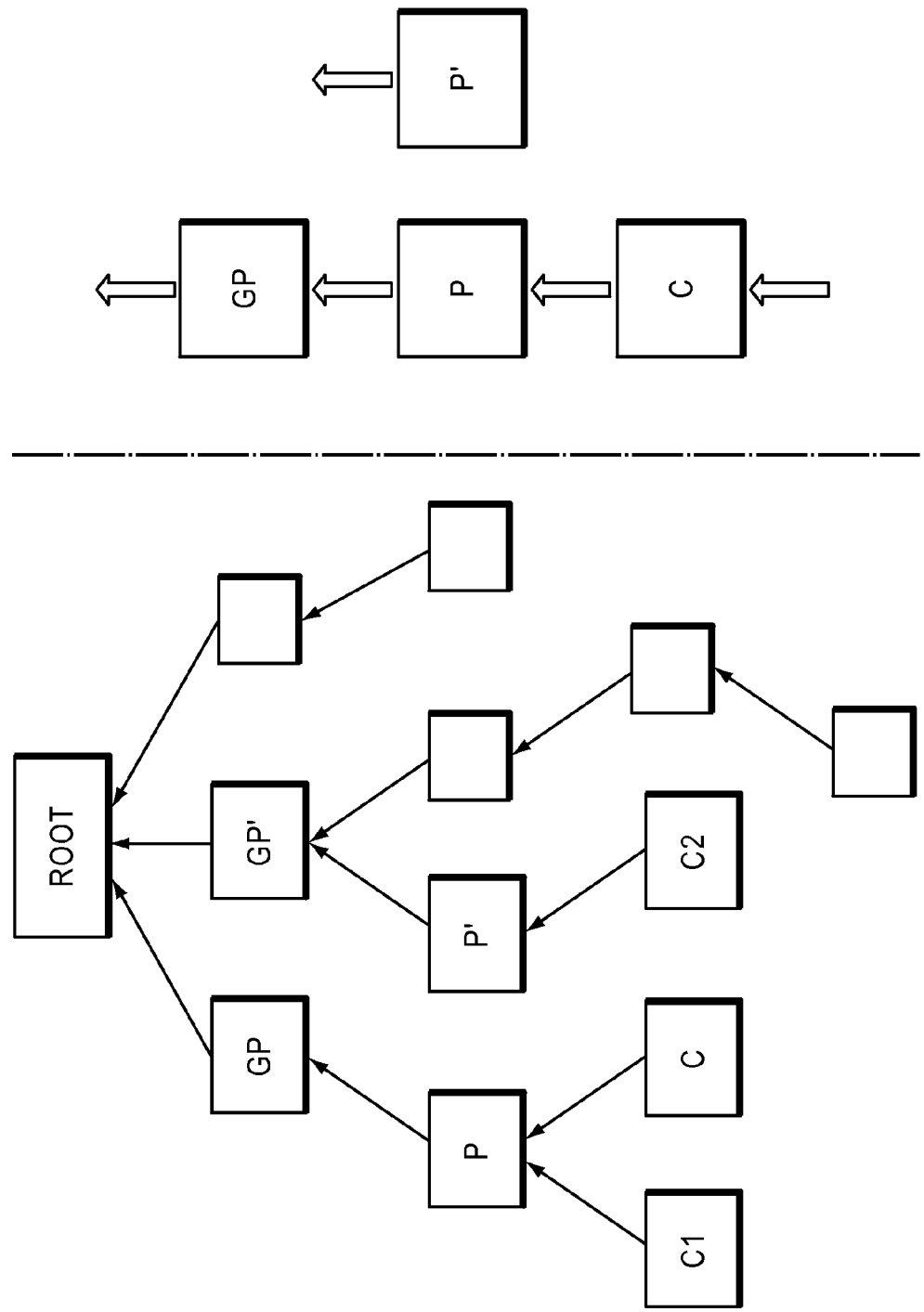
FIG. 5 illustrates an example DAG/tree.

Note that a tree or DAG may be represented as a collection of paths consisting of a list of links and next-hops. As noted above, the downward path from the root of a DAG to a destination in the DAG is basically the reverse of the upward path established from the destination to the root node. According to the techniques herein, an alternate or bypass is established for each hop on the downward path to protect against poisoned links or broken next-hops. Recursively, the path can be seen as a chain of attached child nodes ("C") and parent nodes ("P"), and as used herein, a parent of a parent is referred to as a is grandparent ("GP"), as depicted in FIG. 5. Note that as used herein, C, P, and GP are used to described certain roles with respect to the techniques herein as a matter of perspective between nodes, and a particular node "N" represents a node from its own perspective, thus a node N may act as a C, P, GP, etc., depending upon its current role in the techniques described herein.

Operationally, according to one or more embodiments herein, any node N may advertise (e.g., broadcasts) its list of neighbors into the DAG, namely those neighbors that are visible/reachable to N. This advertisement may be a simple Hello message or other known distribution protocol, and may be transmitted periodically or in response to creation of a DAG or other trigger. For instance, as shown in FIG. 5, a node P may announce its neighbors as GP, P', C, C1, etc. This announcement may also include one or more metrics indicating, e.g., the quality of transmission in one or both directions, for use in selected preferred paths for the DAG as described above.

Figure 6:
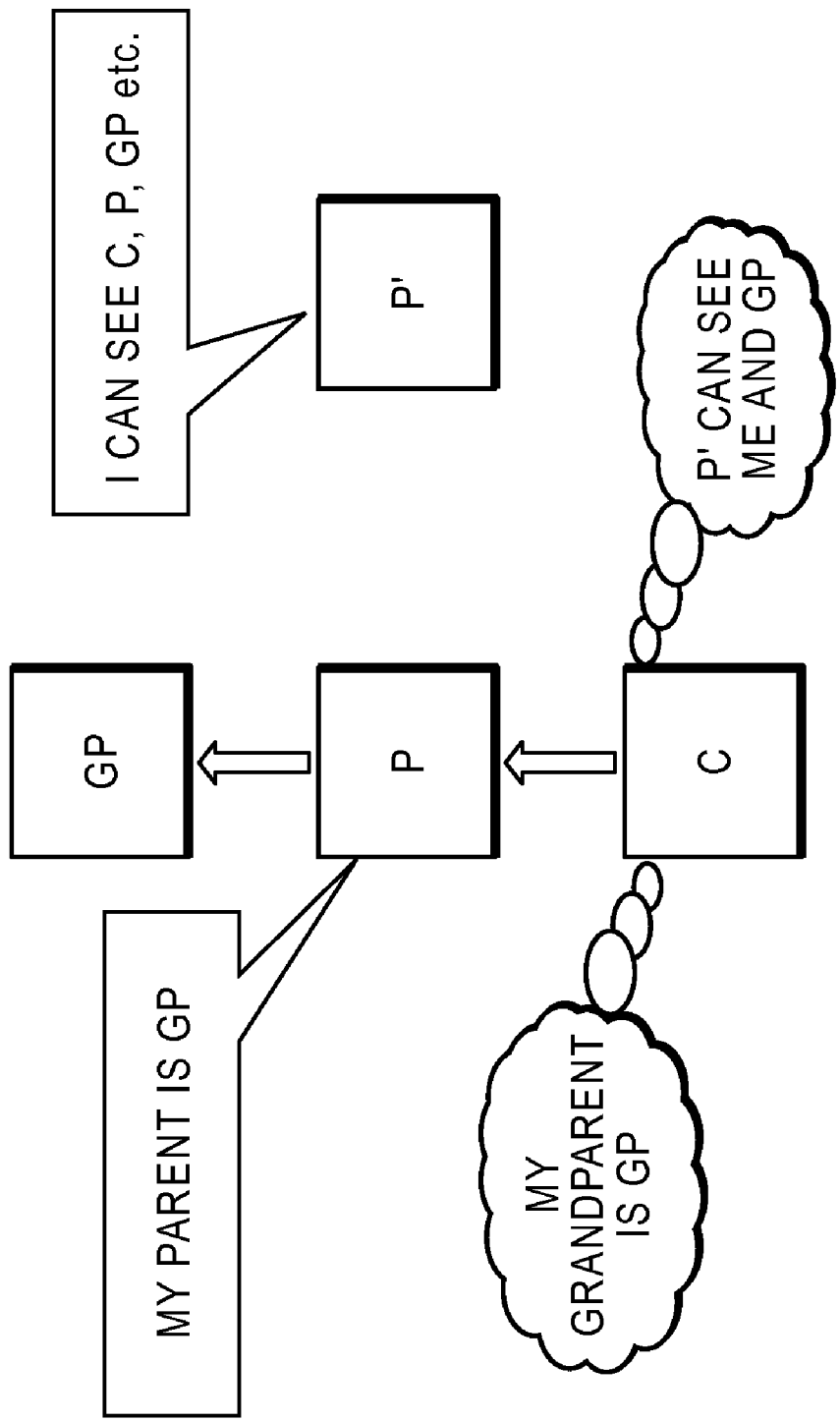
FIG. 6 illustrates an example message exchange and determinations.

Additionally, a tree or DAG may be built in the upward direction, where each child node C selects a preferred parent P within the DAG, illustratively that optimizes metrics (based on the objective function) in the parent-to-child direction. According to the techniques herein, and as shown in FIG. 6, parent nodes announce their own parents into the DAG (e.g., within a DIO message while building the DAG), such that each child may determine its grandparent node GP. Based on the resultant grandparent GP, a child node C of a parent P may select an alternate parent P' that has connectivity to both GP and C. Note that P' may be selected based on good metrics (e.g., a good signal) from GP to P' and from P' to C. Note that as an alternative to Hello messages carrying neighbor lists, this information may be requested on demand, such that a child device C may multicast a message into the DAG that it needs to reach GP, requesting a set of candidates to respond from which C can select GP, P, and P'.

Figure 7A:
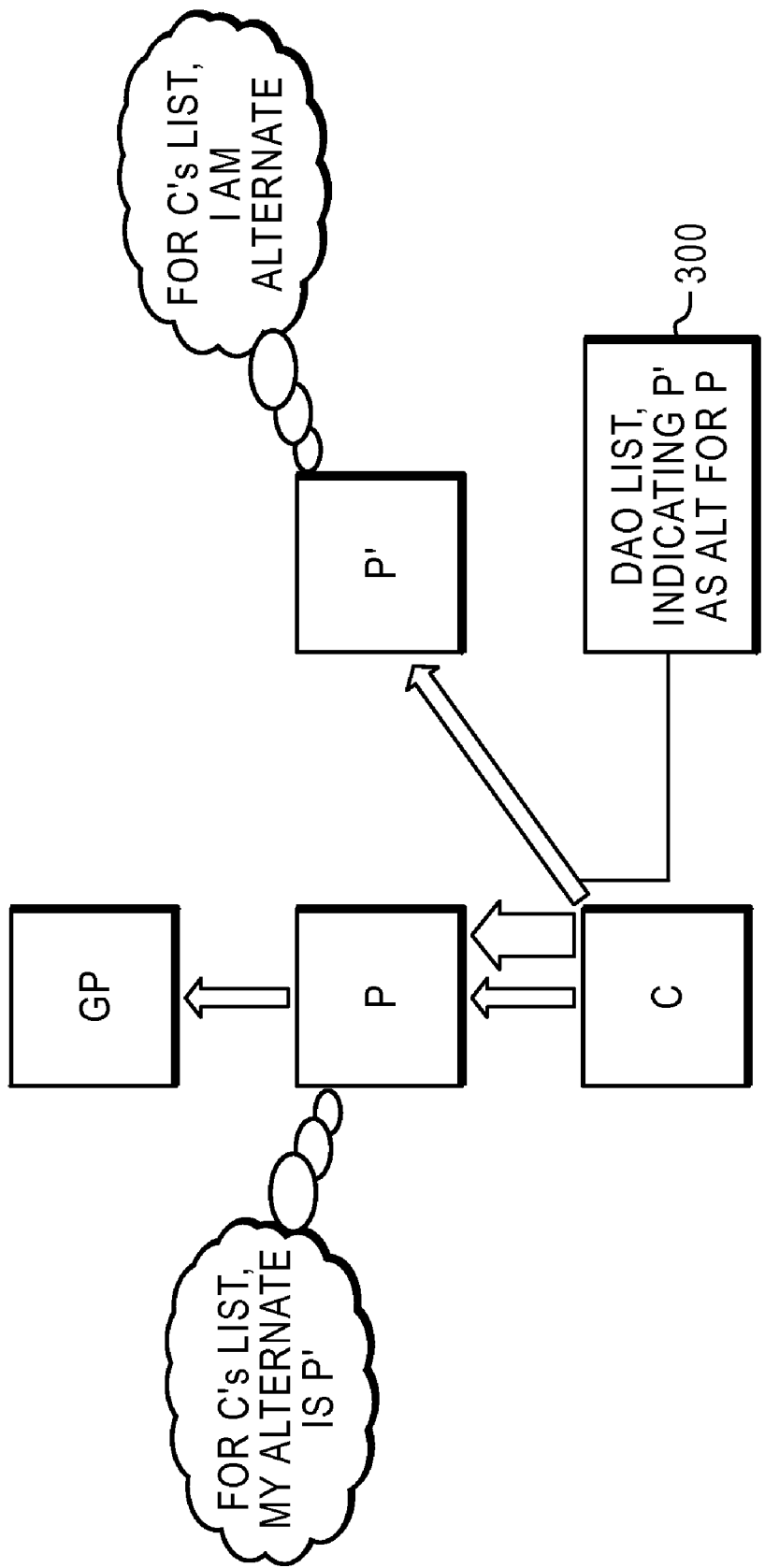
FIGS. 7A-B illustrate an example message exchange and determinations.

As shown in FIG. 7A, C may then send routing advertisements, such as RPL DAOs 300, to P indicating that P' is the alternate for P for the list of prefixes within the routing advertisement. That is, C informs P about prefixes (routes) reachable via C and also about P' as an alternate parent node to P to reach the prefixes reachable via N in the event P becomes unavailable. C also sends the same advertisement to P', indicating still that P' is the alternate parent for the prefixes contained in the message. Notably, the message sent to P and P' may comprise a single, e.g., wireless/radio, transmission, that is received by both P and P' separately on respective network interfaces.

Figure 7B:
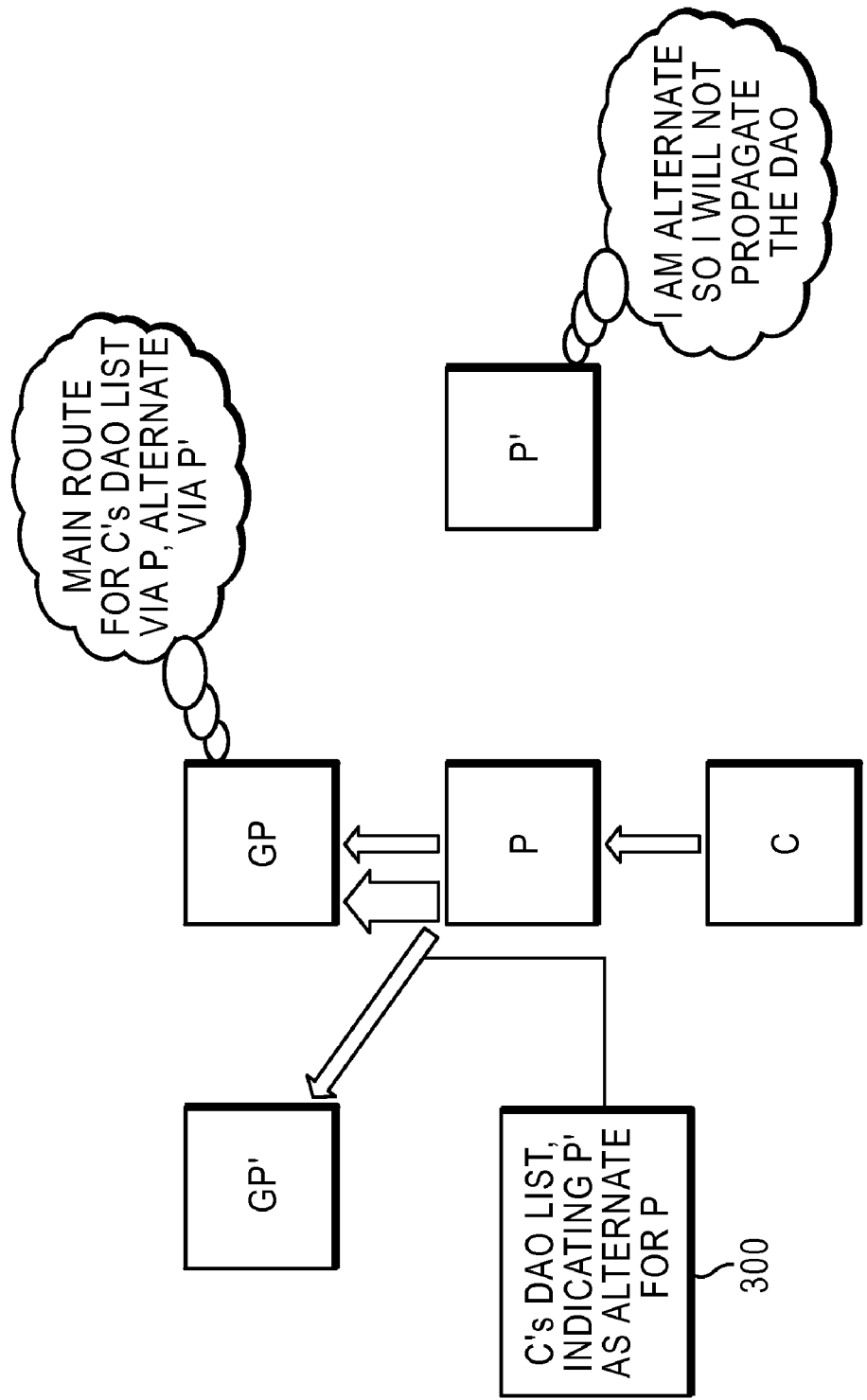

Because P is the preferred parent, as shown in FIG. 7B node P may forward the prefixes reachable from C to its own parent (GP), and recursively routes for those prefixes should reach the root node. However, because P' is an alternate parent, it is configured to refrain from sending that set of routing information to its own preferred parent, avoiding spreading out the DAO (fan-out). Instead, P' simply stores the prefixes reachable via C without informing other nodes, and saves the information in order to quickly respond to unavailability of P. As a result, for each destination that is reachable via C, GP has a main down path/route via P and a backup (alternate) path/route via P', and both P and P' have a down path to the destination via C for use when routing received traffic, accordingly.

Figure 8:
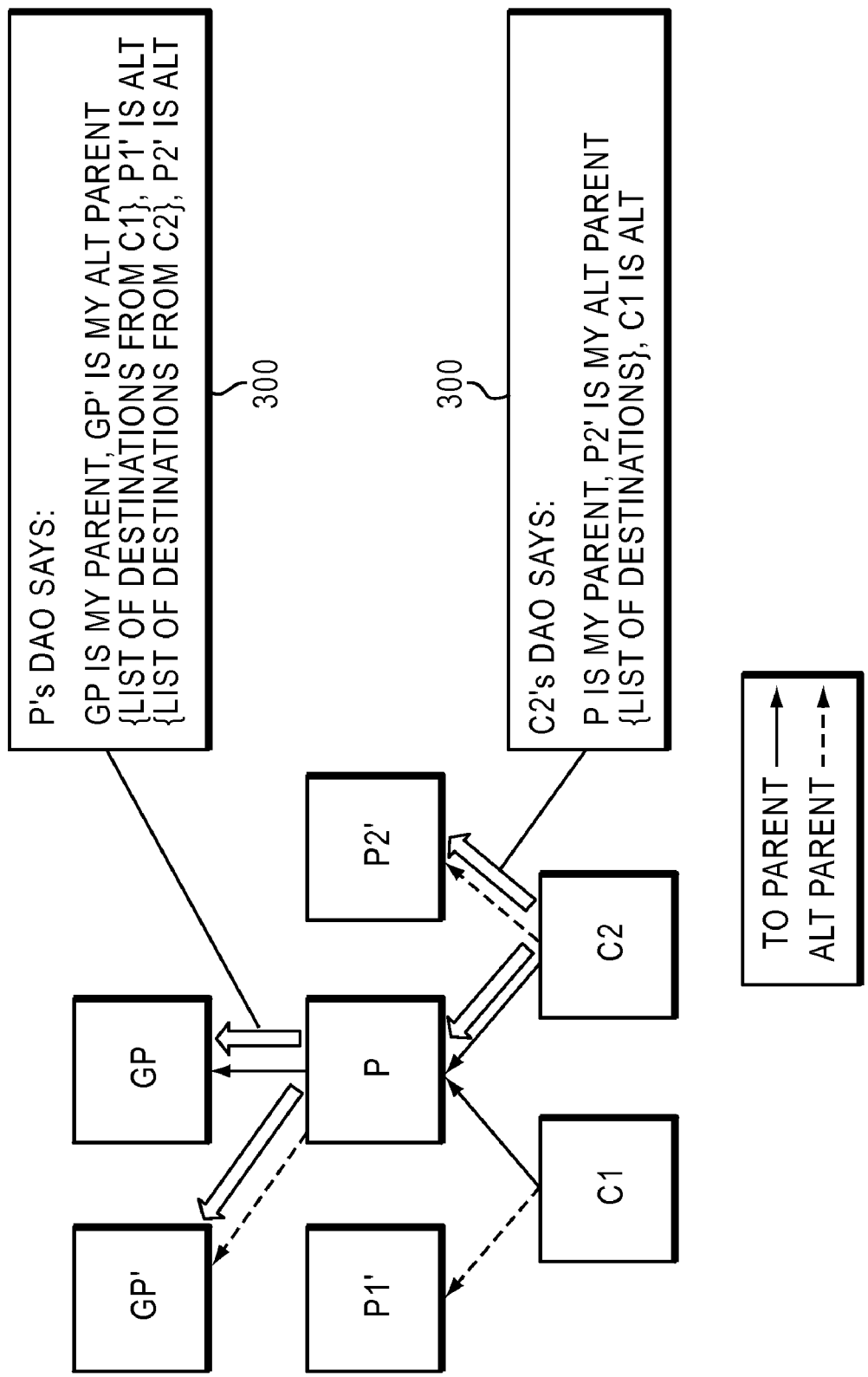
FIG. 8 illustrates an example message exchange and determinations.

The example above is somewhat simplified, in that child device C was the only child to parent device P. As shown in FIG. 8, however, it is often the case that a parent device has multiple children. Assuming there is only one alternate parent P' for all of the children, then the parent P could send GP (and GP') a compiled list of prefixes reachable by all of the children, and that P' is the alternate for all children should P become unavailable. As shown in FIG. 8, though, more complex situations may arise, where two or more children to P, C1 and C2, may each select their own corresponding alternate parent, P1' and P2', respectively. When receiving information about prefixes from a plurality of child nodes in this manner, the parent P may inform GP (and GP') about each of the sets of prefixes as well as a separate corresponding alternate parent for each (e.g., P1' and P2').

Figure 9:
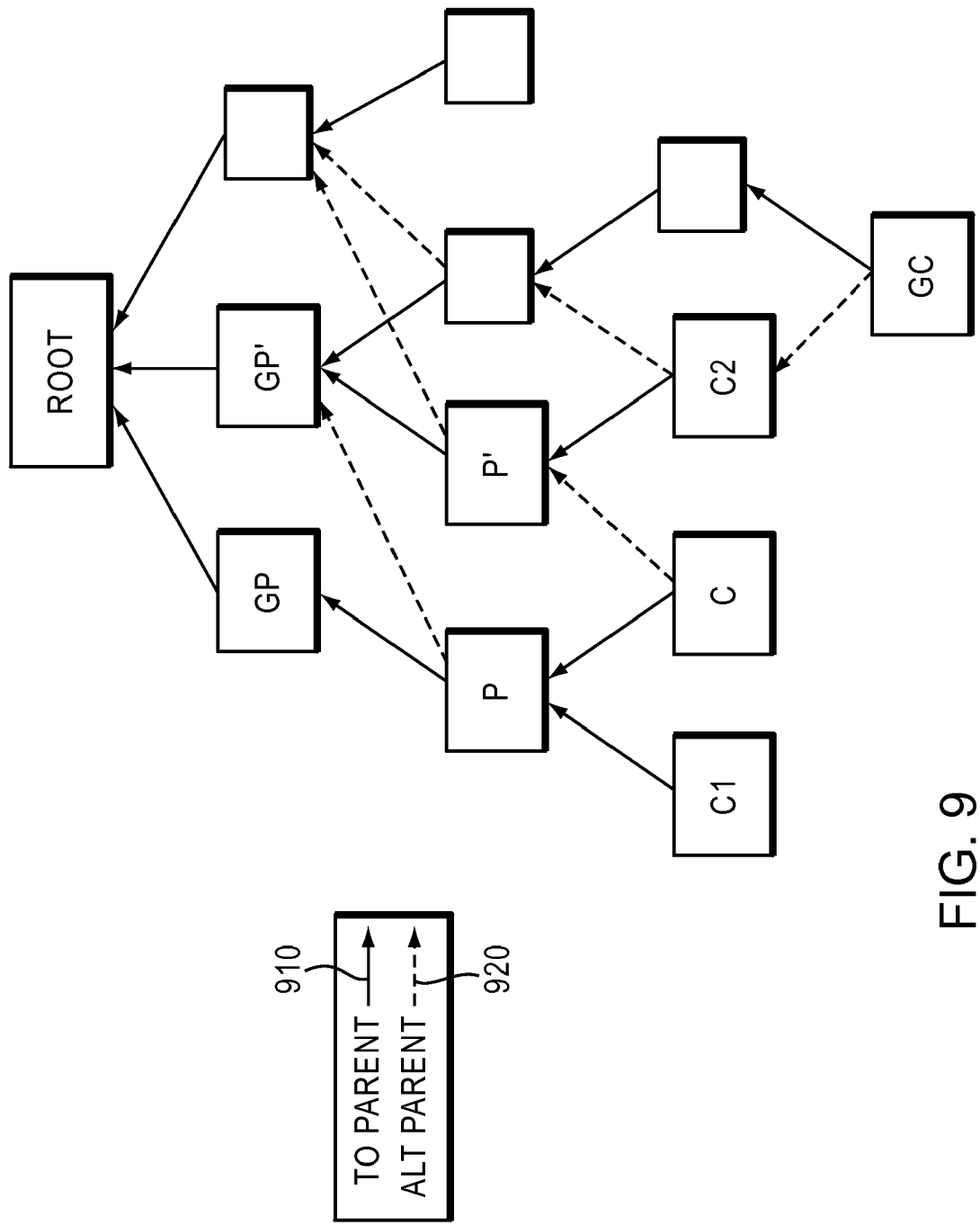
FIG. 9 illustrates an example message exchange.

This logic starts from the destinations, acting as C, and continues toward the root device until the root device is a parent (i.e., until determining that there is no grandparent). FIG. 9 illustrates an example reply message (e.g., DAO) propagation from destinations toward the root device and resultant parent/alternate selections, showing messages 910 sent to the parents, and messages 920 sent to alternate parents. Note that not all hops may have an alternate parent P' or alternate grandparent GP', but those that have the option are configured with the alternates accordingly. Note also that while a succession of devices from child C to grandparent GP to root is shown, the length of the DAG is substantially limitless, where the children can act as parents to other devices (e.g., a "grandchild, GC"). That is, all devices other than the root are children, those with children are also parents, and those with grandchildren are grandparents, etc. Thus, any node "N" can be a child, a parent to receive information from a child, an alternate parent to a child, a grandparent or alternate grandparent to a grandchild, etc.

Figure 10:
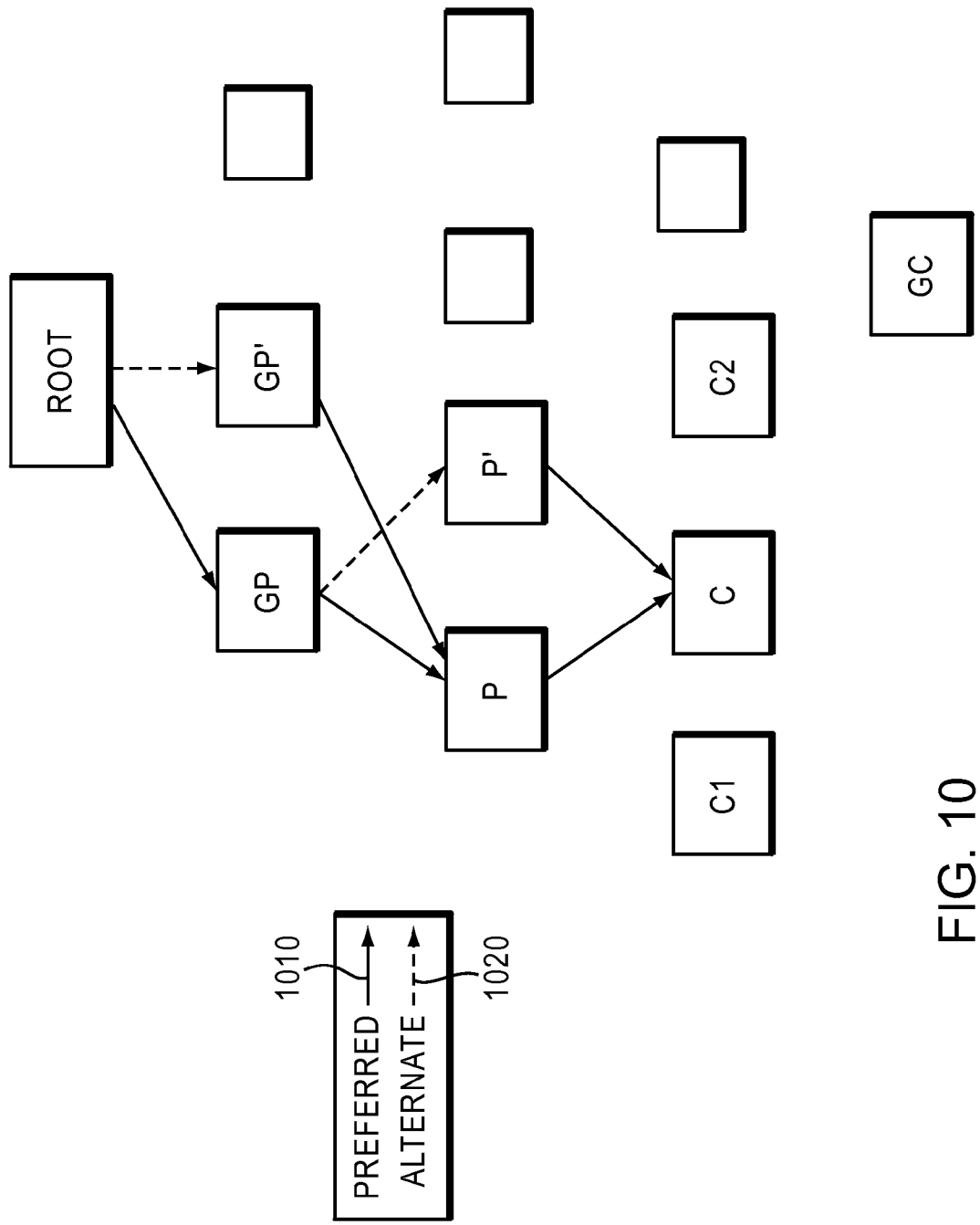
FIG. 10 illustrates an example down data path.

FIG. 10 illustrates an example downward data path from the root device to the destination child node C built as described above. For instance, the preferred path 1010 may be used when there are no problems reaching the preferred devices along the path. However, at various points of the DAG, an alternate path 1020 may be used to traverse the problem area, accordingly.

Figure 11:
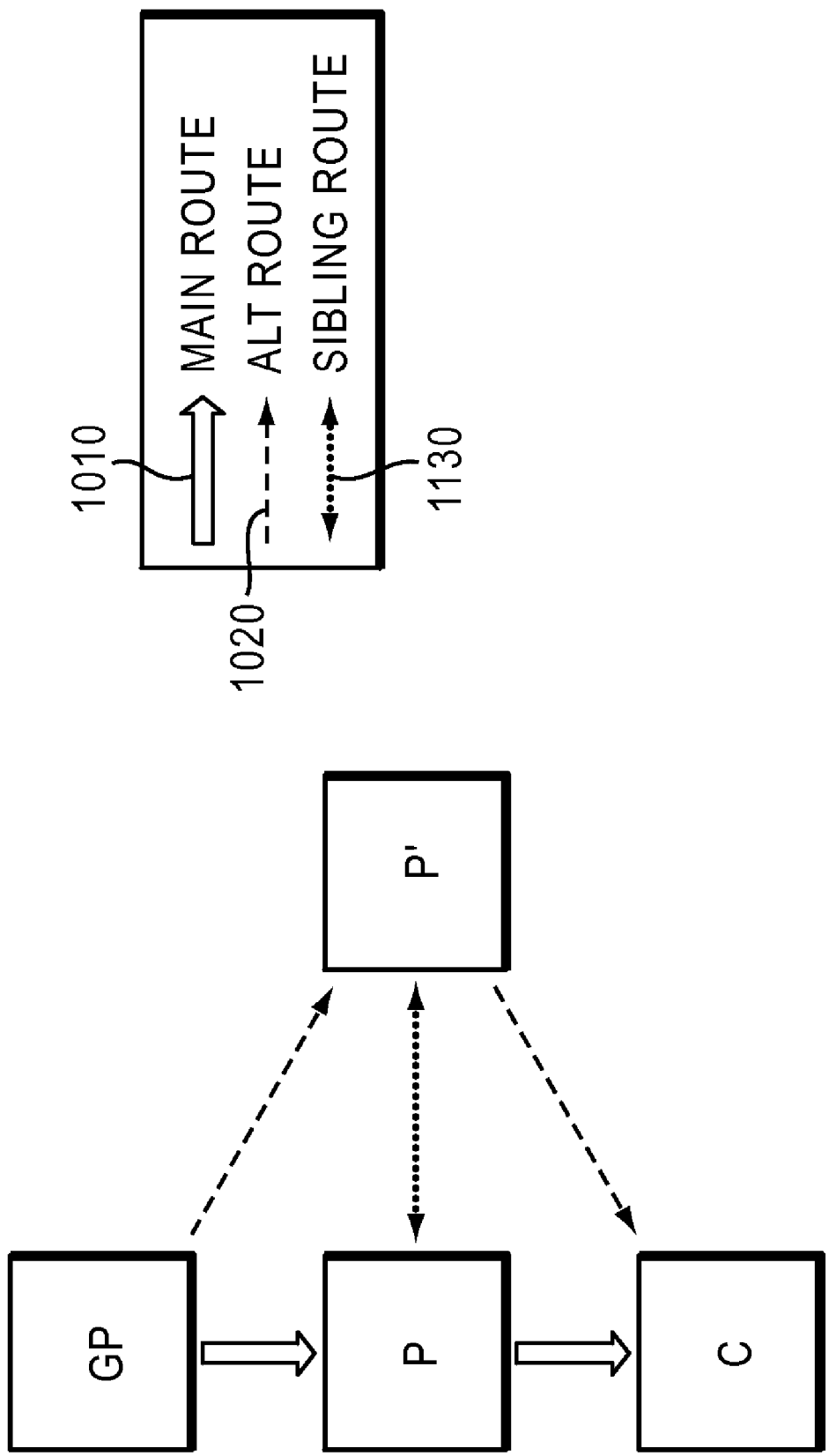
FIG. 11 illustrates an example interconnection between devices.
Figure 12:
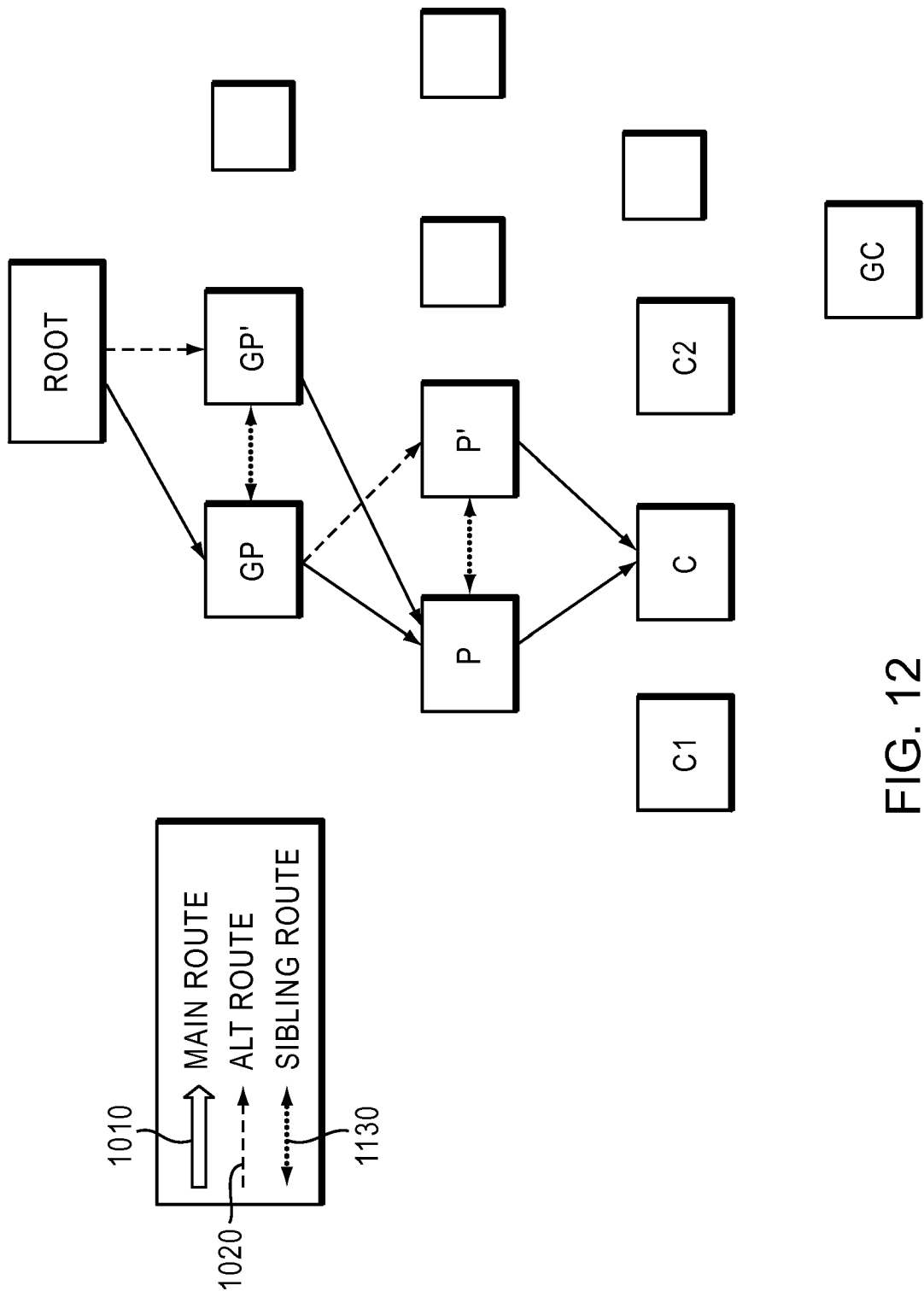
FIG. 12 illustrates an example down data path.

According to one or more embodiments herein, P and P' devices may also establish a sibling route via each other, as shown in FIG. 11. For instance, to encourage the sibling connection between P and P', child node C may initially select P' based on its connectivity to P as an added bonus. Sibling routes 1130 are generally formed in both directions between the devices (assuming acceptable metrics), such that it can be used both ways to send traffic toward the destination, without looping back onto the sibling link. Each device of the sibling connection may be configured to prefer the alternate path, unless that link fails at which time a sibling route may be used to return to the preferred parent (e.g., where the initial reroute was based on a failed GP to P link, and not a failure of P). The data path to C showing sibling routes between devices (parents and grandparents) is shown in FIG. 12.

Figure 13:
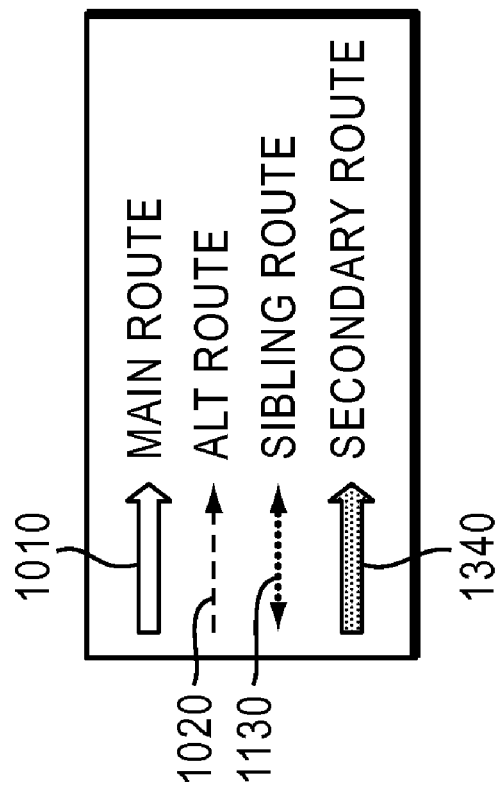
FIG. 13 illustrates an example interconnection between devices.
Figure 13:
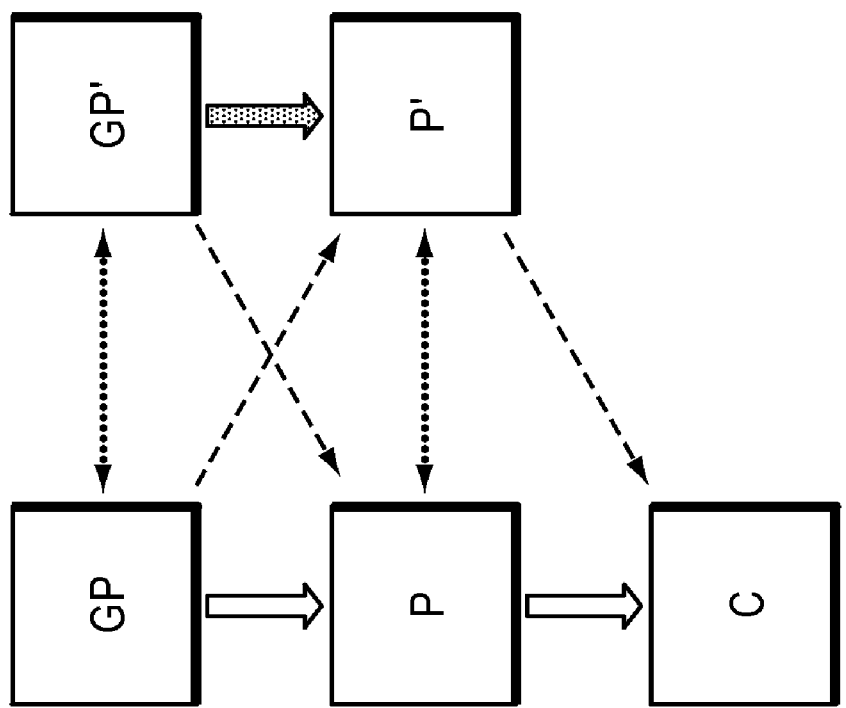

Note that parent node P may also instruct GP' (an alternate parent to GP for P) that P' is an alternate for P for the prefixes reachable via C. If GP' can reach P', e.g., with appropriate metrics, then GP' may also set alternate routes via P' for all prefixes reachable via C, referred to as an established secondary route 1340 as shown in FIG. 13.

Figure 14:
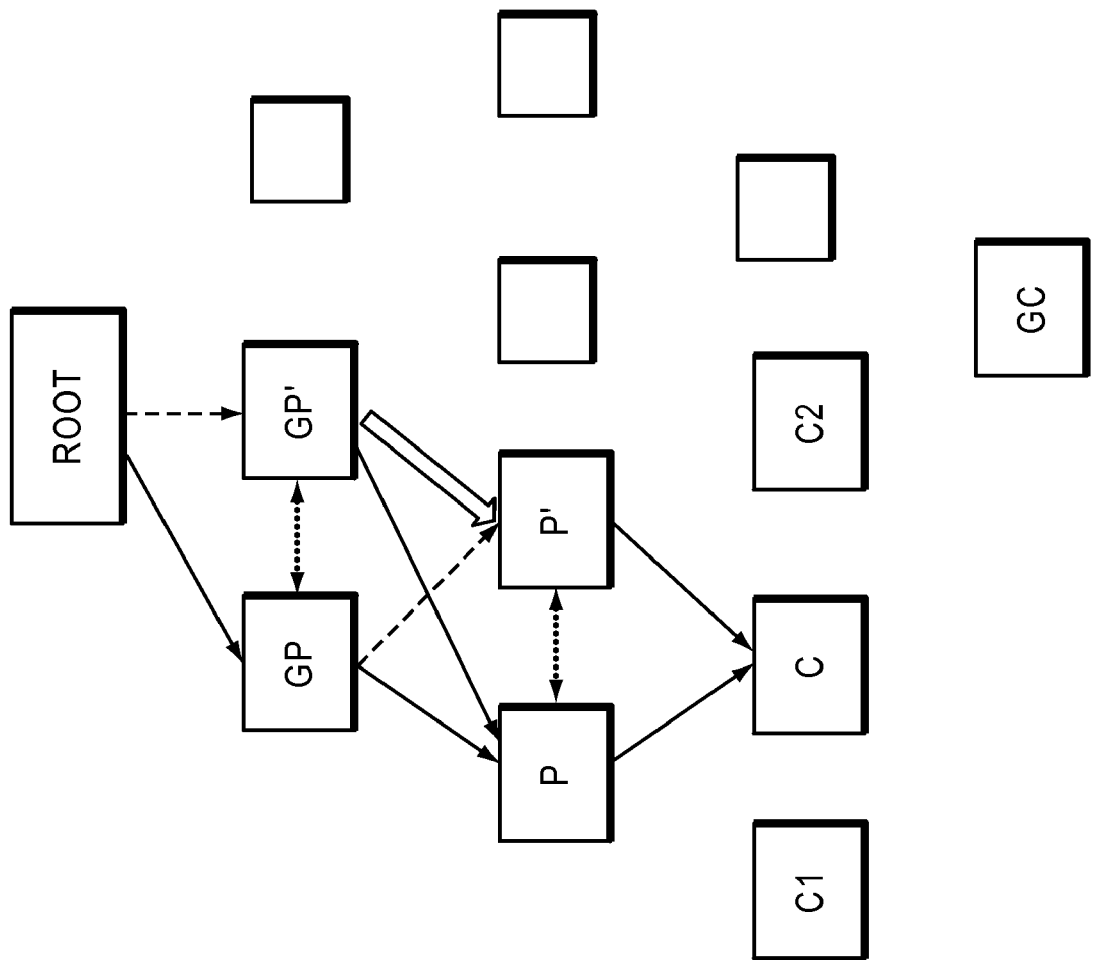
FIG. 14 illustrates an example down data path.
Figure 14:
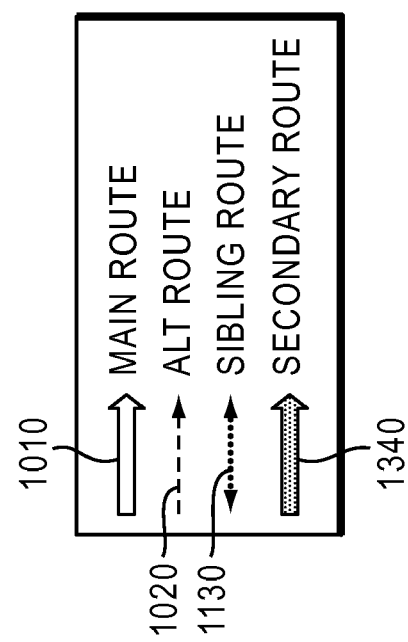
Figure 15:
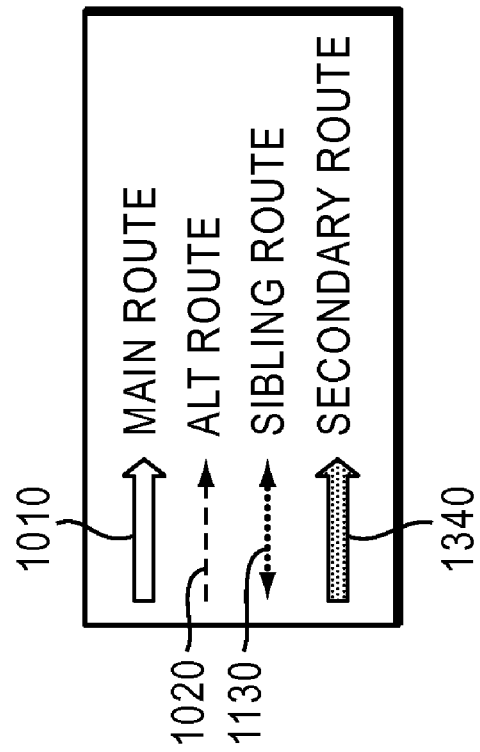
FIG. 15 illustrates an example interconnection between devices.
Figure 15:
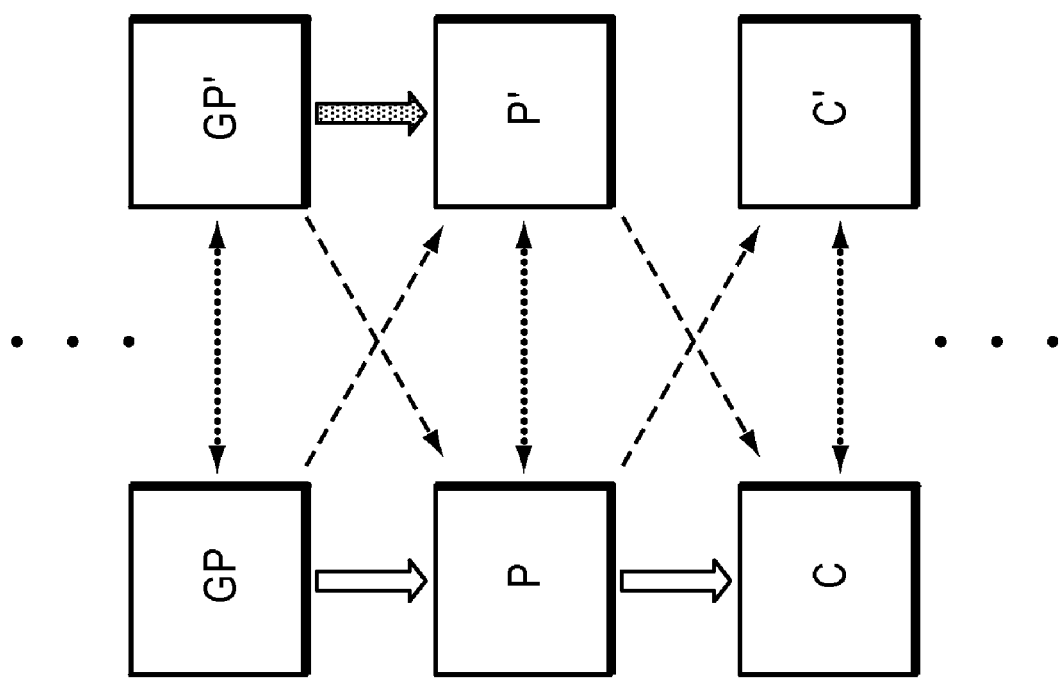

The data path to C from the root including preferred paths 1010, alternate paths 1020, sibling paths 1130, and secondary paths 1340 is shown in FIG. 14. Accordingly, the recursive result of these different paths may continue along the length of the DAG as two "threads" close to one another as shown in FIG. 15, with the possibility of jumping between the threads (though favoring the preferred thread where possible) whenever a problem is encountered. Note that by limiting the distribution of the information from alternate parents and grandparents, the fan-out of this information, generally overkill beyond a first layer of protection, is avoided.

Figure 16:
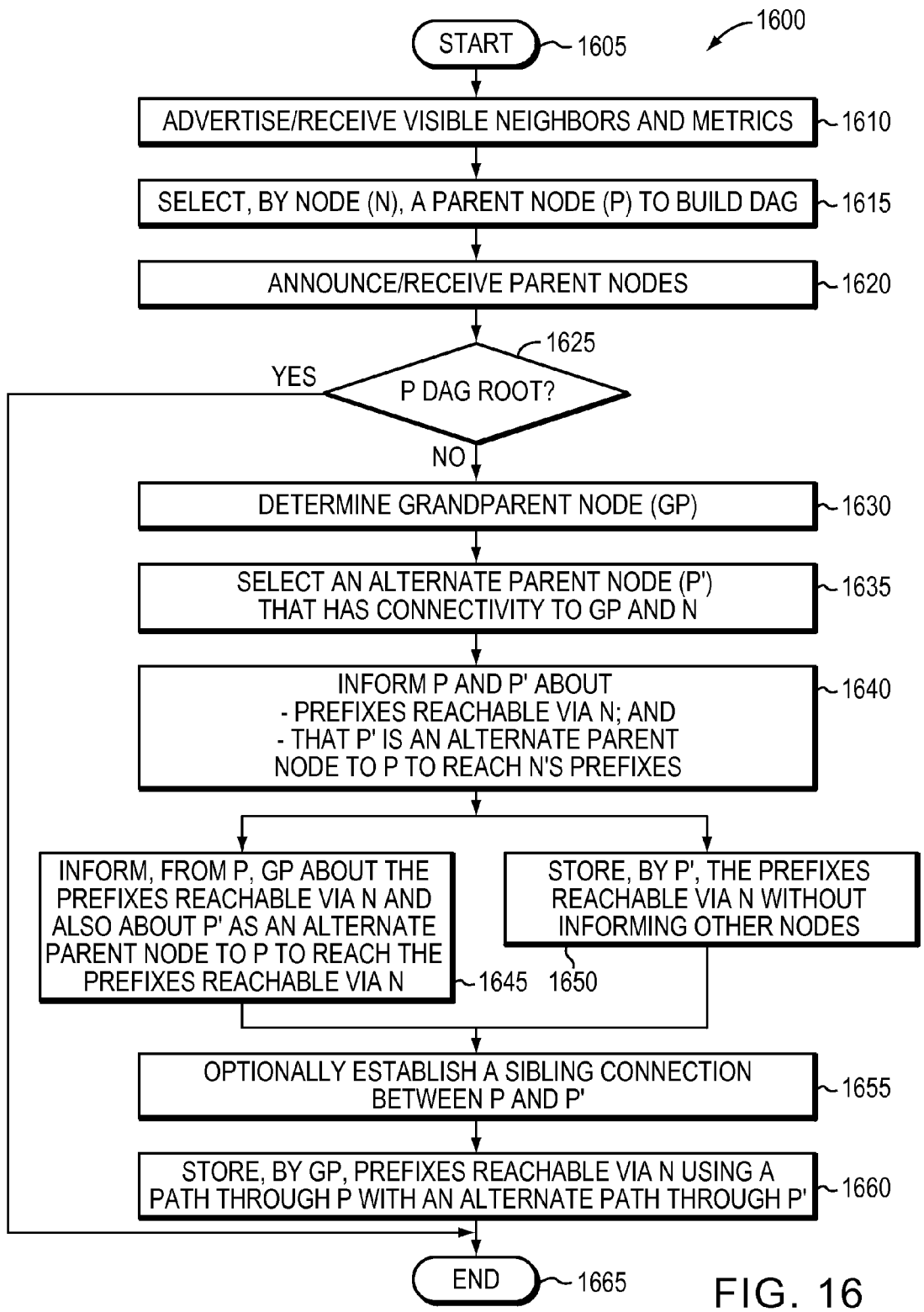
FIG. 16 illustrates an example procedure for providing for alternate down paths for DAG routing.

FIG. 16 illustrates an example simplified procedure for providing for alternate down paths for DAG routing in accordance with one or more embodiments described herein. The procedure 1600 starts at step 1605, and continues to step 1610, where each device 200 in the network 100 may advertise and/or receive a list of visible neighbors and metrics to/from each other reachable (visible) neighbor. Each particular device or node (N) may then select a parent node (P) in step 1615 in order to build a DAG (e.g., a tree), and may share (announce/receive) its parent nodes in step 1620. Assuming that the parent node is not the DAG/tree root in step 1625, then in step 1630, each node N may determine its grandparent node (GP) as the parent of its parent.

As described above, in step 1635 a node N may select an alternate parent node (P') that has connectivity to both GP and N. Accordingly, in step 1640 node N may inform both P and P' about prefixes reachable via N and that P' is an alternate parent node to P to reach N's prefixes (e.g., in a DAO message 300). The parent node P may then inform its parent GP about the prefixes reachable via N in step 1645, while also informing GP about P' as an alternate parent node to P to reach the prefixes reachable via N, in the event P becomes unreachable to GP. Conversely, in step 1650, P' stores the prefixes reachable via N without informing other nodes, e.g., to prevent DAO fan-out. Note that optionally, as mentioned above, P and P' may establish a sibling connection in step 1655, as well. In step 1660, GP may thus store the prefixes reachable via N using a path through P with an alternate path through P'.

The process 1600 shown from the perspective of a child node N continues is sequentially toward the root node in order to propagate the alternate down paths, such as where each parent P also acts as a child N, each grandparent GP acts as a parent to a parent P, etc., consolidating the routes/prefixes as proper as the routes divergence of the DAG/tree converges closer to the root. The procedure 1600 ends in step 1665 for a particular device N, and the resultant paths and alternate paths may be used for routing traffic, accordingly.

The novel techniques described herein provide for alternate down paths for DAG routing in a computer network. In particular, the novel techniques allow a child node ("N") to select an alternate parent in communication with a parent's parent (a grandparent of the child). That is, the techniques above allow the child device to select the alternate in the child-to-grandparent direction for traffic forwarded in the grandparent-to-child direction in the event an intermediary preferred parent becomes unreachable, thus allowing a grandparent to quickly route around broken links and nodes to reach the child device (its grandchild). Also, the techniques above avoid a fan-out effect typical in reverse DAG computation, such as for RPL DAO messages.

While there have been shown and described illustrative embodiments that provide for alternate down paths for DAG routing in a computer network, it is to be understood that various other adaptations and modifications may be made within the spirit and scope of the embodiments herein. For example, the embodiments have been shown and described herein primarily in relation to utilizing DAG routing according to a RPL. However, the embodiments in their broader sense are not so limited, and may, in fact, be used with any DAG or tree building mechanism, such as shortest path first (SPF) implementations (e.g., Open Shortest Path First or Intermediate-System-to-Intermediate-System routing protocols, "OSPF" and "ISIS," respectively).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:

selecting, by a node N within a computer network utilizing a directed acyclic graph (DAG) to route packets, a parent node P within the DAG;

in response to the parent node P not being a root of the DAG, determining, by the node N, a grandparent node GP as a parent node to the parent node P;

selecting, by the node N, an alternate parent node P' that has connectivity to the grandparent node GP and the node N; and informing, from the node N, the parent node P and the alternate parent node P' about prefixes reachable via the node N and also about the alternate parent node P' as an alternate parent node to the parent node P to reach the prefixes reachable via the node N.

2. The method as in claim 1, wherein the parent node P is configured to inform the grandparent node GP about the prefixes reachable via node N and also about the alternate parent node P' as an alternate parent node to the parent node P to reach the prefixes reachable via node N, and wherein the alternate parent node P' is configured to store the prefixes reachable via node N without informing other nodes about the prefixes reachable via node N.

3. The method as in claim 1, further comprising:
receiving, by the node N, information about one or more of the prefixes from a child node C of the node N, the information having an indication of an alternate parent node N' of the child node C that has connectivity to the parent node P and the child node C; and
informing, from the node N, the parent node P and the alternate parent node P' about prefixes reachable via the child node C and also about the alternate parent node N' as an alternate parent node to the node N to reach the prefixes reachable via the child node C.

4. The method as in claim 3, wherein the node N has connectivity to the alternate parent node N', the method further comprising:
establishing a sibling connection between the node N and the alternate parent node N'.

5. The method as in claim 1, further comprising:
receiving, by the node N, information about one or more of the prefixes from a plurality of child nodes of the node N, the information having an indication of an alternate parent for each of the plurality of child nodes of the node N that has connectivity to the parent node P and the respective child node; and
informing, from the node N, the parent node P and the alternate parent node P' about prefixes reachable via each of the plurality of child nodes and also about each respective alternate parent as an alternate parent node to the node N to reach the prefixes reachable via a corresponding child node.

6. The method as in claim 1, further comprising:
receiving, by the node N, information about one or more of the prefixes from a child node C of the node N, the information having an indication of that the node N is an alternate parent of the child node C that has connectivity to a grandparent of the child node C and to the child node C; and
storing, by the node N, prefixes reachable via the node C.

7. The method as in claim 1, further comprising:
receiving, by the node N, information about one or more of the prefixes from a child node C of the node N, the information having an indication that the prefixes are reachable via a grandchild node of the node N through the child node C and an indication of an alternate parent node C' of a grandchild node GC that has connectivity to the node N and the grandchild node GC; and
storing, by the node N, prefixes reachable via the grandchild node GC using a path through the child node C with an alternate path through the alternate parent node C'.

8. The method as in claim 1, further comprising:
advertising, into the DAG from the node N, a list of neighbors visible to the node N.

9. The method as in claim 1, further comprising:
advertising, into the DAG from the node N, that the parent node P is a parent node of the node N.

10. The method as in claim 1, further comprising:
selecting, by the node N, the alternate parent node P' that has connectivity to the grandparent node GP and the node N and the parent node P.

11. The method as in claim 1, further comprising:
selecting the parent node P and the alternate parent node P' based on an objective function (OF) of the DAG.

12. The method as in claim 1, further comprising:
utilizing DAG routing according to a Routing Protocol for Low Power and Lossy Networks (RPL).

13. An apparatus, comprising:
one or more network interfaces adapted to communicate with nodes of a computer network configured to utilize a directed acyclic graph (DAG) to route packets;
a processor coupled to the network interfaces and adapted to execute one or more processes; and
a memory adapted to store a process executable by the processor, the process when executed operable to:
select a parent node P within the DAG;
determine a grandparent node GP as a parent node to the parent node P in response to the parent node P not being a root of the DAG;
select an alternate parent node P' that has connectivity to the grandparent node GP and the apparatus; and
inform the parent node P and the alternate parent node P' about prefixes reachable via the apparatus and also about the alternate parent node P' as an alternate parent node to the parent node P to reach the prefixes reachable via the apparatus.

14. The apparatus as in claim 13, wherein the parent node P is configured to inform the grandparent node GP about the prefixes reachable via the apparatus and also about the alternate parent node P' as an alternate parent node to the parent node P to reach the prefixes reachable via the apparatus, and wherein the alternate parent node P' is configured to store the prefixes reachable via the apparatus without informing other nodes about the prefixes reachable via the apparatus;
receive information about one or more of the prefixes from a child node C of the apparatus, the information having an indication of an alternate parent node N' of the child node C that has connectivity to the parent node P and the child node C; and
inform the parent node P and the alternate parent node P' about prefixes reachable via the child node C and also about the alternate parent node N' as an alternate parent node to the apparatus to reach the prefixes reachable via the child node C.

15. The apparatus as in claim 13, wherein the process when executed is further operable to:
receive information about one or more of the prefixes from a child node C of the apparatus, the information having an indication of an alternate parent node N' of the child node C that has connectivity to the parent node P and the child node C; and
inform the parent node P and the alternate parent node P' about prefixes reachable via the child node C and also about the alternate parent node N' as an alternate parent node to the apparatus to reach the prefixes reachable via the child node C.

16. The apparatus as in claim 13, wherein the process when executed is further operable to:
receive information about one or more of the prefixes from a plurality of child nodes of the apparatus, the information having an indication of an alternate parent for each of the plurality of child nodes of the apparatus that has connectivity to the parent node P and the respective child node; and inform the parent node P and the alternate parent node P' about prefixes reachable via each of the plurality of child nodes and also about each respective alternate parent as an alternate parent node to the apparatus to reach the prefixes reachable via a corresponding child node.

17. The apparatus as in claim 13, wherein the process when executed is further operable to:

receive information about one or more of the prefixes from a child node C of the apparatus, the information having an indication of that the apparatus is an alternate parent of the child node C that has connectivity to a grandparent of the child node C and to the child node C; and store prefixes reachable via the child node C.

18. The apparatus as in claim 13, wherein the process when executed is further operable to:

receive information about one or more of the prefixes from a child node C of the apparatus, the information having an indication that the prefixes are reachable via a grandchild node of the apparatus through the child node C and an indication of an alternate parent node C' of a grandchild node GC that has connectivity to the apparatus and the grandchild node GC; and store prefixes reachable via the grandchild node GC using a path through the child node C with an alternate path through the alternate parent node C'.

19. A non-transitory computer-readable media having software encoded thereon, the software, when executed on a node N utilizing a directed acyclic graph (DAG) to route packets, operable to:

select a parent node P within the DAG;

determine a grandparent node GP as a parent node to the parent node P in response to the parent node P not being a root of the DAG;

select an alternate parent node P' that has connectivity to the grandparent node GP and the node N; and inform the parent node P and the alternate parent node P' about prefixes reachable via the node N and also about the alternate parent node P' as an alternate parent node to the parent node P to reach the prefixes reachable via the node N.

20. The non-transitory computer-readable media as in claim 19, wherein the parent node P is configured to inform the grandparent node GP about the prefixes reachable via the node N and also about the alternate parent node P' as an alternate parent node to the parent node P to reach the prefixes reachable via the node N, and wherein the alternate parent node P' is configured to store the prefixes reachable via the node N without informing other nodes about the prefixes reachable via the node N.

21. The non-transitory computer-readable media as in claim 19, wherein the software when executed is further operable to:

receive information about one or more of the prefixes from a child node C of the node N, the information having an indication of an alternate parent node N' of the child node C that has connectivity to the parent node P and the child node C; and inform the parent node P and the alternate parent node P' about prefixes reachable via the child node C and also about the alternate parent node N' as an alternate parent node to the node N to reach the prefixes reachable via the child node C.

22. The non-transitory computer-readable media as in claim 19, wherein the software when executed is further operable to:

receive information about one or more of the prefixes from a child node C of the node N, the information having an indication of that the node N is an alternate parent of the child node C that has connectivity to a grandparent of the child C and to the child C; and store prefixes reachable via the child C.

23. The non-transitory computer-readable media as in claim 19, wherein the software when executed is further operable to:

receive information about one or more of the prefixes from a child node C of the node N, the information having an indication that the prefixes are reachable via a grandchild node of the node N through the child node C and an indication of an alternate parent node C' of a grandchild node GC that has connectivity to the node N and the grandchild node GC; and store prefixes reachable via the grandchild node GC using a path through the child node C with an alternate path through the alternate parent node C'.

* * * * *

UNITED STATES PATENT AND TRADEMARK OFFICE
CERTIFICATE OF CORRECTION

PATENT NO. : 8,363,662 B2  
APPLICATION NO. : 12/727893  
DATED : January 29, 2013  
INVENTOR(S) : Pascal Thubert et al.

Page 1 of 1

It is certified that error appears in the above-identified patent and that said Letters Patent is hereby corrected as shown below:

In the Specification

In col. 6, line 31 should read:  
ing each successive receiving device ~~is~~ in the other direction In col. 10, line 10 should read:  
node N continues ~~is~~ sequentially toward the root node in order Signed and Sealed this  
Twenty-fifth Day of June, 2013

Teresa Stanek Rea  
*Acting Director of the United States Patent and Trademark Office*